(12) United States Patent
Samoto et al.

(10) Patent No.: US 6,840,096 B2
(45) Date of Patent: Jan. 11, 2005

(54) THROTTLE-OPENING DETECTING APPARATUS

(75) Inventors: Haruhiko Samoto, Shizuoka (JP); Norio Hayashi, Shizuoka (JP); Michiyuki Suzuki, Shizuoka (JP); Masahiro Kawamura, Shizuoka (JP)

(73) Assignees: Yamaha Hatsudoki Kabushiki Kaisha, Shizuoka-ken (JP); Asahi Denso Co., Ltd., Shizuoka (JP)

( * ) Notice: Subject to any disclaimer, the term of this patent is extended or adjusted under 35 U.S.C. 154(b) by 42 days.

(21) Appl. No.: 10/368,424

(22) Filed: Feb. 20, 2003

(65) Prior Publication Data

US 2003/0159529 A1 Aug. 28, 2003

(30) Foreign Application Priority Data

Feb. 26, 2002 (JP) ........................................ 2002-049756

(51) Int. Cl.[7] ............................................. G01M 13/00
(52) U.S. Cl. ........................................................ 73/118.1
(58) Field of Search ............................ 73/112, 113, 116, 73/117.2, 117.3, 118.1, 118.2, 119 A

(56) References Cited

U.S. PATENT DOCUMENTS

| | | | |
|---|---|---|---|
| 3,982,446 A | | 9/1976 | Van Dyken |
| 4,554,990 A | * | 11/1985 | Kamiya et al. ............. 180/197 |
| 5,881,833 A | * | 3/1999 | Branch et al. .............. 180/179 |
| 6,135,227 A | * | 10/2000 | Laning ........................ 180/170 |
| 6,318,490 B1 | * | 11/2001 | Laning ........................ 180/170 |
| 6,491,555 B2 | * | 12/2002 | Kitsu et al. .................... 440/87 |
| 6,576,890 B2 | * | 6/2003 | Lin et al. ............... 250/231.14 |
| 2002/0028616 A1 | * | 3/2002 | Kitsu et al. .................... 440/87 |
| 2002/0179825 A1 | * | 12/2002 | Lin et al. ............... 250/231.14 |
| 2003/0172763 A1 | * | 9/2003 | Samoto et al. ................ 74/485 |

OTHER PUBLICATIONS

Japanese Abstract No. 04254278, dated Sep. 9, 1992.
Japanese Abstract No. 59038139, dated Mar. 1, 1984.
Japanese Abstract No. 06344968, dated Dec. 12, 1994.

* cited by examiner

Primary Examiner—Eric S. McCall
(74) Attorney, Agent, or Firm—Sughrue Mion, PLLC

(57) ABSTRACT

A throttle-opening detecting apparatus has a case mounted on a handle bar of a vehicle, a throttle grip mounted on a leading end side of the handle bar so as to be rotatable with respect to the handle bar, a throttle-opening sensor incorporated in the case for detecting a rotation angle of the throttle grip and, a friction plate applying a frictional force in an opposite direction with respect to the rotation of the throttle grip to the throttle grip while the throttle grip is rotated so as to provide a throttle-opening detecting apparatus which not only can omit the throttle wire but also can obtain the rotation load of the throttle grip similar to the conventional throttle-opening detecting apparatus to thereby permit execution of the operation of the throttle grip without giving the driver a strange feeling.

10 Claims, 5 Drawing Sheets

THROTTLE-OPENING DETECTING APPARATUS

BACKGROUND OF THE INVENTION

1. Field of the invention

The present invention relates to a throttle-opening detecting apparatus which detects the rotation angle of a throttle grip mounted on a handle bar in a vehicle such as a two-wheeled vehicle to thereby detect a throttle-opening.

2. Description of the Related Art

A throttle-opening detecting apparatus for use in a two-wheeled vehicle is structured such that it detects the rotation angle of a throttle grip mounted on a handle bar and transmits a detect signal representing the thus-detected rotation angle to an electronic control unit carried on board the two-wheeled vehicle. In accordance with the detect signal, the electronic control unit carries out a given operation and, in accordance with the result of the operation, the ignition timing of an engine or the opening and closing of an exhaust valve is controlled.

A conventional throttle-opening detecting apparatus, for example, as disclosed in JP-A-4-254278, comprises mainly a drive pulley movable together with a throttle grip and rotatable in the same direction as the throttle grip, a drive gear formed in the lower portion of the drive pulley, a detecting gear rotatable in meshing engagement with the drive gear, and a potentiometer for detecting the rotation angle of the detecting gear; and, these drive pulley, drive gear, detecting gear and potentiometer are incorporated in a case fixed to a handle bar.

In this structure, in case where the throttle grip is rotated, not only the drive pulley is worked with the rotation of the throttle grip but also the detecting gear in meshing engagement with the drive gear formed in the lower portion of the drive pulley is rotated. The potentiometer detects the rotation angle of the detecting gear to thereby detect the rotation angle of the throttle grip, that is, the throttle-opening, and transmits the detected value to an electronic control unit.

On the other hand, one end of a throttle wire is fixed to the drive pulley and thus, in case where the drive pulley is rotated with the rotation of the throttle grip, the throttle wire is pulled by the drive pulley to thereby be able to operate a throttle valve connected to the other end of the throttle wire.

However, in the above-mentioned conventional throttle-opening detecting apparatus, since only the detected values are transmitted to the electronic control unit to thereby control the ignition timing of an engine and the opening and closing of an exhaust valve, the connection of the throttle-opening detecting apparatus to the throttle valve requires the throttle wire. The throttle wire can be operated so as to be pulled by the drive pulley due to the rotation of the drive pulley; and, therefore, when the throttle wire is in operation, excessive tension is applied to the throttle wire, which raises a problem that the throttle wire can be cut easily.

Also, since the throttle wire slides within an outer tube to transmit the operation of the drive pulley to the throttle valve, there arises a problem that, in case where the operating oil within the outer tube runs out, the operation of the throttle wire becomes heavy. In view of this, in case where a signal detected by the throttle-opening detecting apparatus is transmitted to the electronic control unit and the opening and closing of the throttle valve is controlled in accordance with the value operated by the electronic control unit, the throttle wire can be omitted, which makes it possible to solve the problem caused by the throttle wire.

However, in case where the throttle wire is omitted, there arises another problem that there can be obtained almost no load when rotating the throttle grip, thereby giving a driver a strange feeling. That is, in case where there is no load at all for pulling the throttle wire, the throttle grip can be rotated with a very light rotation force, which rather makes it difficult to adjust the rotation quantity of the throttle grip.

SUMMARY OF THE INVENTION

The present invention aims at eliminating the above-mentioned drawbacks found in the conventional throttle-opening detecting apparatus. Accordingly, it is an object of the present invention to provide a throttle-opening detecting apparatus which not only can omit the throttle wire but also can obtain the rotation load of the throttle grip similar to the conventional throttle-opening detecting apparatus to thereby permit execution of the operation of the throttle grip without giving the driver a strange feeling.

According to the present invention as set forth in a first aspect, there is provided a throttle-opening detecting apparatus having a case mounted on a handle bar of a vehicle, a throttle grip mounted on a leading end side of the handle bar from the case so as to be rotatable with respect to the handle bar, a throttle-opening sensor incorporated in the case for detecting a rotation angle of the throttle grip, and a friction plate applying a frictional force in an opposite direction with respect to the rotation of the throttle grip to the throttle grip while the throttle grip is rotated.

According to the present structure, when the throttle grip is rotated, a frictional force in the opposite direction with respect to the rotation of the throttle grip is applied to the throttle grip by the friction plate. Based on this frictional force, there can be generated a rotation load with respect to the throttle grip.

According to the present invention as set forth in a second aspect, in the present invention as set forth in the first aspect, further having a gear mechanism including a plurality of gears worked with the throttle grip, the gear mechanism being interposed between the throttle grip and the throttle-opening sensor, wherein the friction plate is urged toward one of the gears of the gear mechanism by a plurality of springs.

According to the present invention as set forth in a third aspect, in the present invention as set forth in the second aspect, wherein the friction plate is formed as a circular ring including a through hole in such a manner that the handle bar is inserted in the substantially central portion thereof, and the plurality of springs are concentrically contacted with the friction plate.

According to the present invention as set forth in a fourth aspect, in the present invention as set forth in any one of the first to three aspects, wherein the case includes two half-divided cases, the two half-divided cases being respectively mounted onto the handle bar from an upper and a lower directions of the apparatus so as to be held the handle bar therebetween.

In addition to this, it is preferable that the throttle-opening sensor is mounted on the upper side of the case.

DETAILED DESCRIPTION OF THE PREFERRED EMBODIMENTS

Now, description will be given below specifically of an embodiment of a throttle-opening detecting apparatus according to the present invention with reference to the accompanying drawings.

Figure 1:
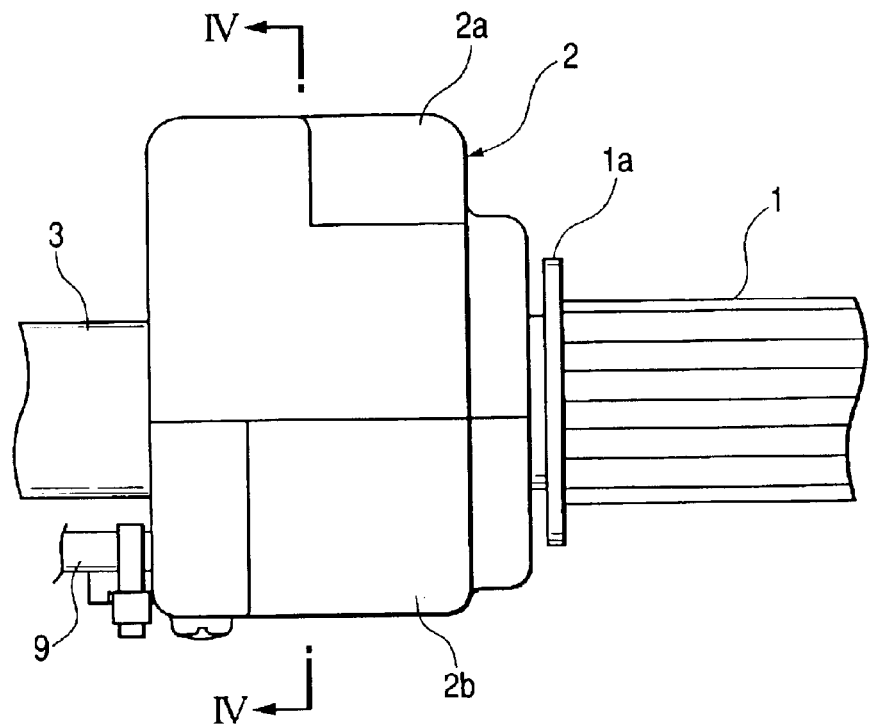
FIG. 1 is a front view of an embodiment of a throttle-opening detecting apparatus according to the present invention.
Figure 2:
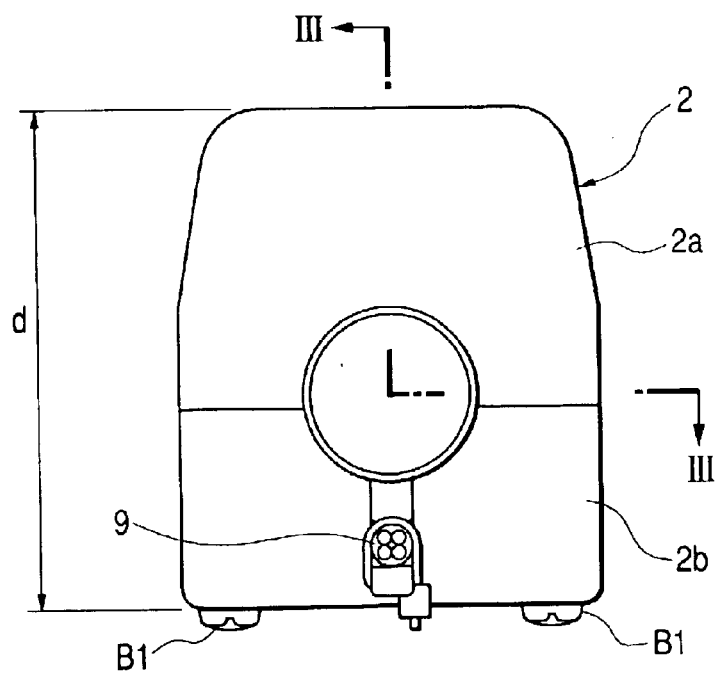
FIG. 2 is a left side view of the embodiment of a throttle-opening detecting apparatus according to the present invention.

A throttle-opening detecting apparatus according to the present embodiment is structured such that it detects the rotation angle of a throttle grip mounted on the handle bar of a two-wheeled vehicle and transmits the detect signal to an electronic control unit such as an ECU carried on board the two-wheeled vehicle; and, it has such an appearance shape as shown in FIGS. 1 and 2. In FIGS. 1 and 2, a throttle grip 1 is rotatably mounted on the leading end of the right handle bar of the two-wheeled vehicle and a resin-made case 2 is fixed to the base end side (in FIG. 1, the left end side) of the present throttle grip 1.

Figure 4:
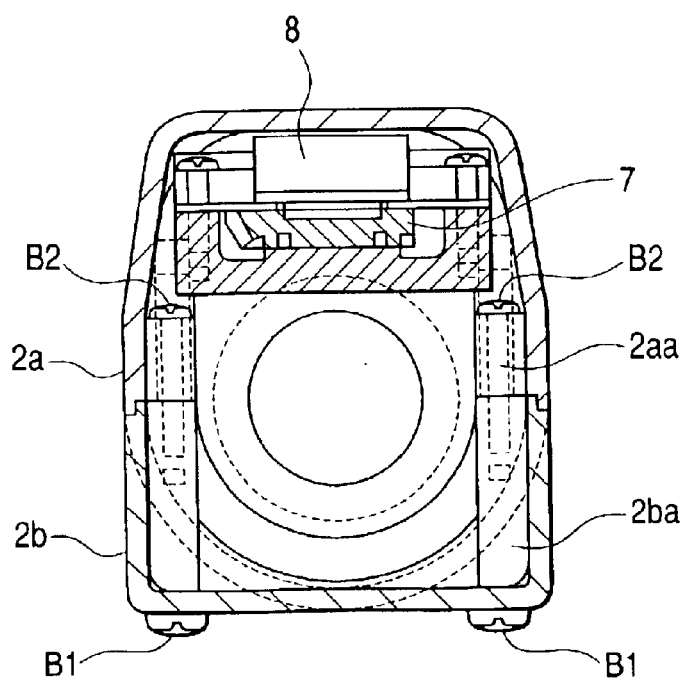
FIG. 4 is a section view taken along the line IV—IV shown in FIG. 1.

The case 2 includes two half-divided cases, that is, an upper case 2a and a lower case 2b; and, the upper and lower cases hold a handle bar 3 therebetween to thereby combine the case 2 and handle bar 3 into an integral body. The upper and lower cases 2a and 2b, as shown in FIG. 4, are fixed to each other by inserting and threadedly engaging two pairs of screws B1 and B2 into the upper and lower cases 2a and 2b. By the way, reference characters 2ba, 2aa designate bosses which are formed so as to allow the screws B2 to be inserted thereinto and threadedly engaged therewith; and, although not shown, there are separately disposed bosses which allow the screws B1 to be inserted thereinto and threadedly engaged therewith.

Figure 3:
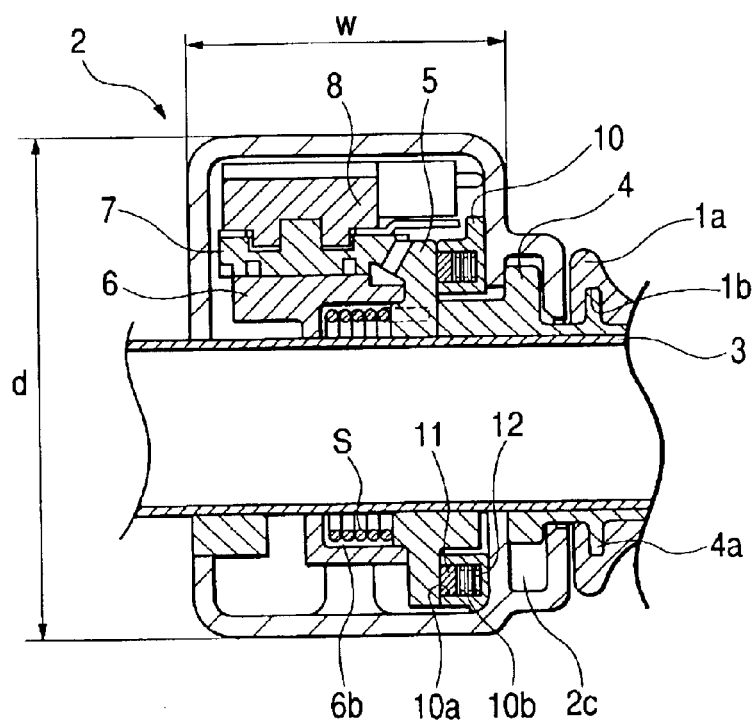
FIG. 3 is a section view taken along the line III—III shown in FIG. 2.

The throttle grip 1 rotates coaxially with the handle bar 3 to thereby structure an accelerator which can obtain an arbitrary engine output and, on the base end side of the throttle grip 1, there is formed a flange portion 1a which projects in a direction substantially perpendicular to the extension direction of the handle bar 3. In the inner peripheral surface of the flange portion 1a, as shown in FIG. 3, there are formed a pair of upper and lower slits 1b.

Figure 8:
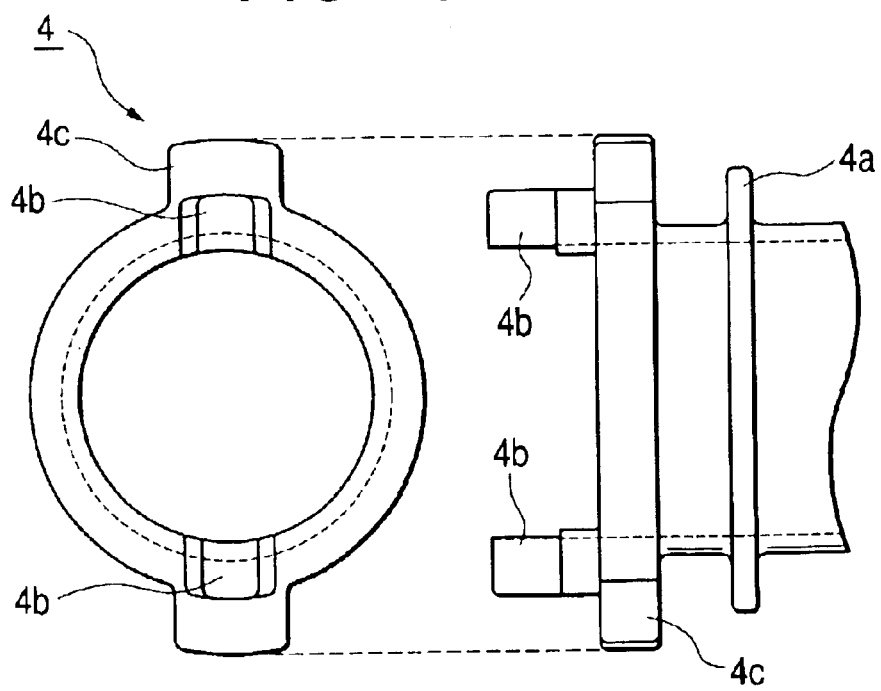
FIG. 8 is a left side view of the left end side of a tube guide used in the embodiment of a throttle-opening detecting apparatus according to the present invention, and a front view thereof.

A tube guide 4 is interposed between the throttle grip 1 and handle bar 3 and can be rotated together with the throttle grip 1 to thereby be able to transmit its rotation to a drive gear 5 (which will be discussed later). In the tube guide 4, as shown in FIG. 8, there is formed a projecting portion 4a which can be fitted into and secured to the pair of slits 1b formed in the throttle grip 1 and, in the base end (in FIG. 3, the left end) of the tube guide 4, there are formed a pair of leg portions 4b which project toward a drive gear 5.

The leg portions 4b of the tube guide 4 are fitted with and secured to the right end face of the drive gear and, in case where the throttle grip 1 is rotated with respect to the handle bar 3, the drive gear 5 can be rotated through the tube guide 4. By the way, in the base end of the tube guide 4, there is formed a flange portion 4c which projects in the upward and downward directions; and, in the case 2, there is disposed a storage portion 2c for storing the flange portion 4c therein.

Figure 9:
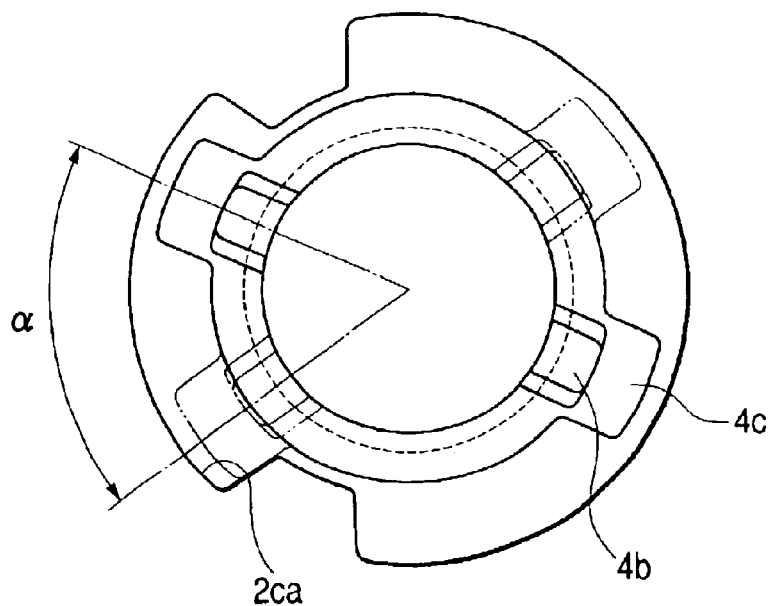
FIG. 9 is a typical view of the rotation area of the tube guide used in the embodiment of a throttle-opening detecting apparatus according to the present invention; and, FIG. 10 is a perspective view of a friction plate, springs for urging the friction plate, and a plate case for storing them therein respectively used in the embodiment of a throttle-opening detecting apparatus according to the present invention.

This storage portion 2c is formed in such a shape as shown in FIG. 9 and, in part of the inner peripheral surface of the storage portion 2c, there is formed a recessed portion 2ca which is used to restrict the shift range of one flange portion 4c. That is, one flange portion 4c is able to shift only within the recessed portion 2ca, which restricts the rotation angle of the throttle grip 1 to a given range. By the way, the operation angle a of the throttle grip 1 according to the present embodiment is set for approx. 60° and, in addition to this, there is set a play angle of approx. 10°.

Figure 5:
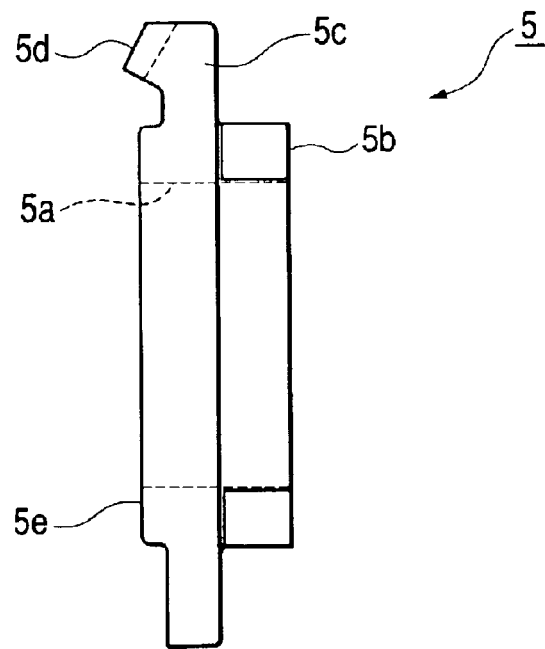
FIG. 5 is a front view of a drive gear used in the embodiment of a throttle-opening detecting apparatus according to the present invention.
Figure 6:
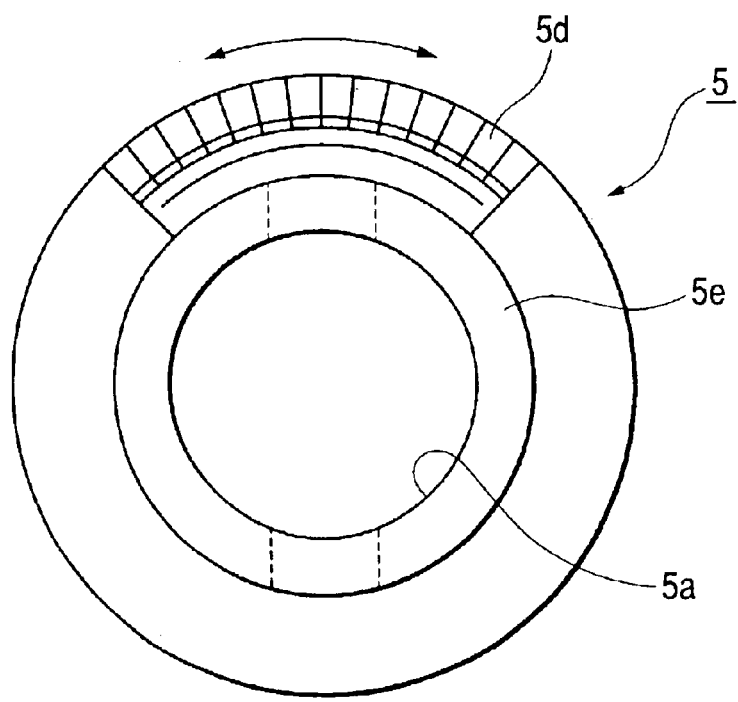
FIG. 6 is a left side view of the drive gear used in the embodiment of a throttle-opening detecting apparatus according to the present invention.

Referring now to the drive gear 5, it is made of a resin molding. Specifically, it is structured such that, as shown in FIG. 5, substantially in the central portion of the drive gear 5, there is formed an insertion hole 5a through which the handle bar 3 can be inserted; and, in the end face of the drive gear 5, there are molded a fitting portion 5b engageable with the tube guide 4 and a projecting portion 5c projecting upwardly so as to be formed as a united body. In the leading end of the projecting portion 5c, as shown in FIG. 6, there is formed a teeth portion (bevel gear) 5d which is inclined by a given angle; and, as the drive gear 5c is rotated, the teeth portion 5d can be shifted in the arrow mark direction in FIG. 6.

That is, in case where the throttle grip 1 is rotated, the rotation power of the throttle grip 1 is transmitted through the tube guide 4 to the drive gear 5 and, therefore, the drive gear 5 can be rotated in the same direction as the throttle grip 1 in linking with the throttle grip 1. By the way, in the opposite surface of the drive gear 5 to the surface thereof that the fitting portion 5b is formed in, there is formed an expanded portion 5e which is expanded by a given dimension; and, the expanded portion 5e cooperates together with a recessed portion 6b formed in a storage member 6 (which will be discussed below) in forming a space for storing a return spring S therein.

On the other hand, in FIG. 3, on the left side of the drive gear 5, the storage member 6 including the recessed portion 6b is fixed to the interior of the case 2 with the handle bar 3 inserted therethrough and, in the space defined by the recessed portion 6b and the above-mentioned expanded portion 5e, there is stored the return spring S. The return spring S includes a torsion spring one end of which is fixed to the storage member 6 and the other end of which is fixed to the drive gear 5. And, in case where a driver takes off (loosens) hands from the throttle grip 1 which has been rotated, the return spring S returns the throttle grip 1 back to the original position through the drive gear 5.

Figure 7:
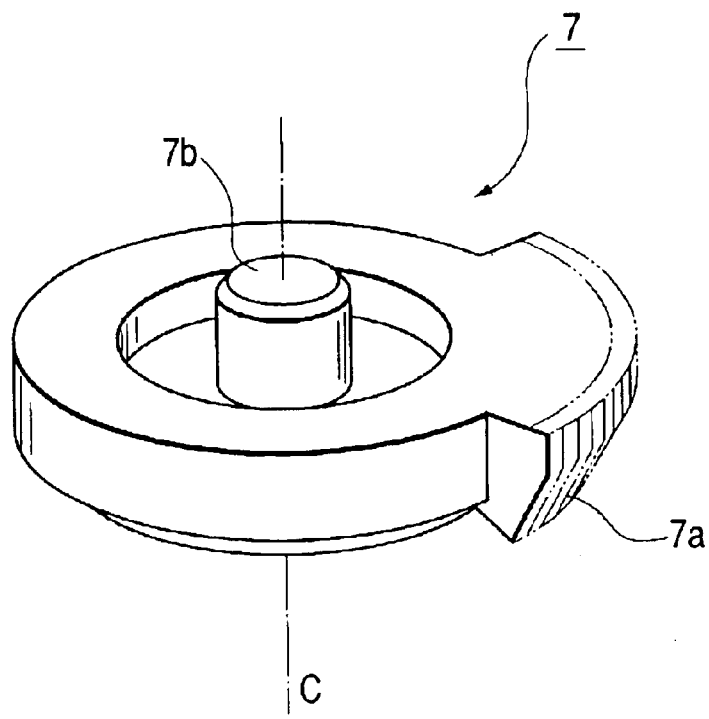
FIG. 7 is a perspective view of a detecting gear used in the embodiment of a throttle-opening detecting apparatus according to the present invention.

The upper surface of the storage member 6 is formed as a flat surface and, on the flat surface, there is disposed a detecting gear 7 so as to be rotated. The detecting gear 7, as shown in FIG. 7, includes a substantially disk-shaped member which can be rotated about an axis C which is substantially perpendicular to the extension direction of the handle bar 3 and, in part of the side surface of the detecting gear 7, there is formed a teeth portion (bevel gear) 7a which is inclined by a given angle. By the way, the detecting gear 7 cooperates together with the above-mentioned drive gear 5 in forming a gear mechanism.

The teeth portion 7a of the detecting gear 7 is disposed so as to be meshingly engaged with the teeth portion 5d of the drive gear 5; and, as the drive gear 5 is rotated, the teeth portion 7a can be rotated about the axis C. Also, on the upper surface of the detecting gear 7, there is formed a projecting portion 7b which projects upwardly. The projecting portion 7b is connected to a throttle-opening sensor 8 including a potentiometer, so that the rotation angle of the detecting gear 7 can be detected.

That is, in case where the throttle grip 1 is rotated, the detecting gear 7 is rotated through the tube guide 4 and drive gear 5, the rotation angle of the detecting gear 7 is detected by the throttle-opening sensor 8 to thereby be able to recognize the rotation angle of the throttle grip 1 (throttle-opening). By the way, a detect signal detected by the throttle-opening sensor 8 is transmitted through a wire 9 (see FIGS. 1 and 2) to an electronic control unit (not shown) such as an ECU which is carried on board the vehicle; and, in accordance with the operation value of the electronic control unit, the ignition timing of an engine as well as the opening and closing of an exhaust valve can be controlled.

Also, since the detect signal detected by the throttle-opening sensor 8 is transmitted through the electronic control unit to the throttle valve as well to thereby be able to control the opening and closing of the throttle valve, there can be omitted the throttle wire that has been used conventionally. This eliminates not only the need for the mounting and maintenance of the throttle wire but also the inconvenience that has been caused by the poor operation or cutting of the throttle wire.

Figure 10:
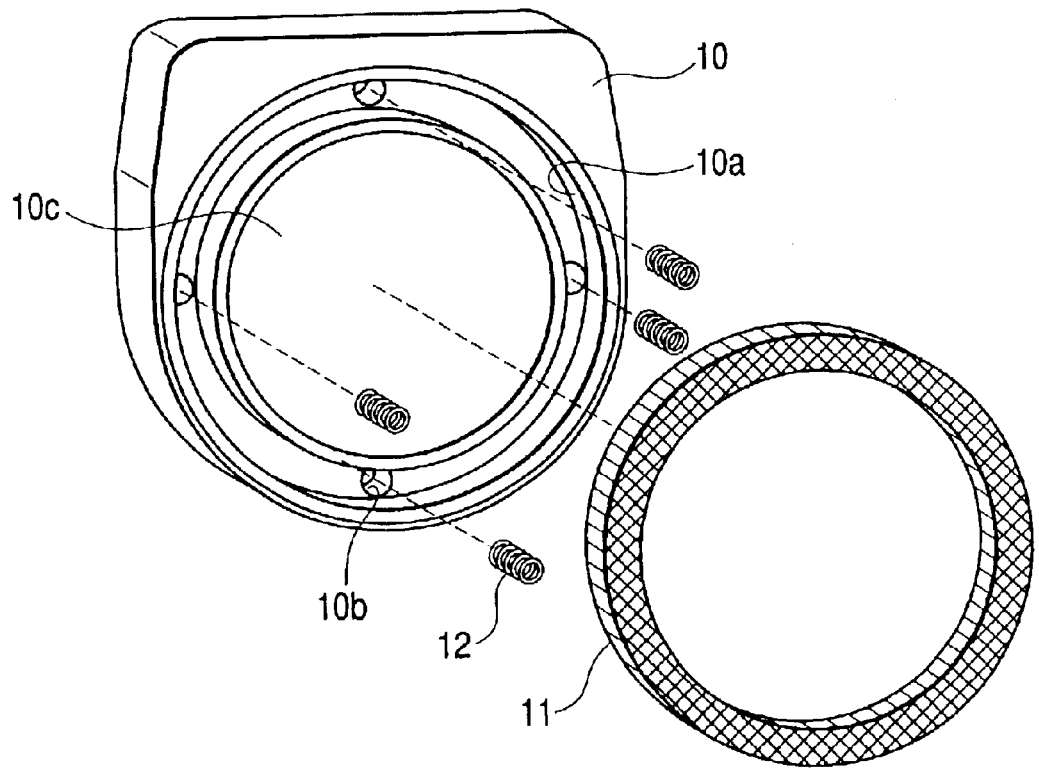

Here, in FIG. 3, reference character 10 designates a plate case which is disposed in the interior of the case 2. In the plate case 10, as shown in FIG. 10, substantially in the central portion thereof, there is formed an insertion hole 10c through which the handle bar 3 can be inserted, and, concentrically with the insertion hole 10c, there is formed a circular-ring-shaped groove 10a. Into the circular-ring-shaped groove 10a, there can be fitted a friction plate 11 which can be contacted with the drive gear 5 to thereby apply a frictional force to the drive gear 5.

In the case of the friction plate 11, the whole shape thereof may be formed by molding a general-purpose friction material; or, resin or light metal may be molded into the shape of the friction plate 11 and the surface thereof (at least the surface that is to be contacted with the drive gear 5) maybe then enhanced in the roughness. By the way, in the present embodiment, there is used a circular-ring-shaped friction plate. However, instead of this, there can also be used other various arrangements; for example, a plurality of rectangular-shaped friction plates may be arranged along the circular-ring-shaped groove 10a.

Also, in the circular-ring-shaped groove 10a, there are formed four holes 10b at regular intervals and, into the four holes 10b, there can be stored springs 12 respectively. That is, after the springs 12 are respectively stored into their associated holes 10b, the friction plate 11 is fitted into the circular-ring-shaped groove 10a; and, therefore, the friction plate 11 is always urged by the springs 12 in a direction to move apart from the plate case 10 (that is, toward the drive gear 5).

Accordingly, a resisting force based on the frictional force can be applied to the rotation of the drive gear 5 and thus, in case where the throttle grip 1 is rotated and the drive gear 5 is thereby rotated, there can be produced a frictional force in the opposite direction to the rotation of the drive gear 5. As a result of this, there can be produced a given load when rotating the throttle grip 1, which makes it possible to obtain a similar operating feeling to the conventional arrangement in which the throttle wire is disposed.

Also, by changing the springs 12 and friction plate 11, there can be obtained an arbitrary resisting force (rotation load), which makes it possible for the driver to easily become familiar with the present arrangement when rotating the throttle grip 1. Further, the number of the springs 12 is not limited to four as in the present embodiment but they may be arranged at a plurality of positions. As described above, since the friction plate 11 is urged toward the drive gear 5 by the plurality of springs 12, the friction plate 11 can be contacted with the drive gear 5 uniformly over the entire area of the surface thereof, thereby being able to prevent the friction plate 11 from wearing down unevenly.

As described above, because the case 2 includes the two half-divided cases, that is, the upper case 2a and lower case 2b, there can be enhanced the efficiency of an operation to be executed when mounting the case 2 onto the handle bar 3. Also, since the throttle-opening sensor 8 is mounted on the upper side of the case 2, even in case where the rainwater penetrates into the case 2, the throttle-opening sensor 8 can be prevented from being immersed in the rainwater, which makes it possible to prevent the malfunction of the throttle-opening detecting apparatus due to the immersion into water of the throttle-opening sensor 8.

Although description has been given here to fore of the present embodiment, the present invention is not limited to this, for example, the gears (drive gear and detecting gear) constituting the gear mechanism may also include other gears than the bevel gears. That is, the teeth of the drive gear and detecting gear may not be inclined but the drive gear and detecting gear may be both rotated about a shaft extending in parallel to the extension direction of the handle bar. Also, in the present embodiment, the throttle-opening detecting apparatus is mounted on the handle bar of the two-wheeled vehicle. However, the throttle-opening detecting apparatus may also be mounted on the other vehicles (such as an ATV and a snowmobile) including a handle bar.

According to the present invention as set forth in the first aspect, since a frictional force in the opposite direction to the rotation direction of the throttle grip is applied to the throttle grip by the friction plate to thereby generate a rotation load in the throttle grip, not only the throttle wire can be omitted but also there can be obtained a similar throttle grip rotation load to the conventional throttle-opening detecting apparatus, which allows a driver to operate the throttle grip without suffering from any strange feeling.

Also, according to the present invention as set forth in the second aspect, because the friction plate is urged by the springs toward the given gears which constitute the gear mechanism, the rotation load of the throttle grip can be generated positively. Also, by changing the dimensions of the springs in various manners, the frictional force of the springs can be adjusted to thereby provide an arbitrary rotation load in the throttle grip.

Further, according to the present invention as set forth in the third aspect, since the circular-ring-shaped friction plate is urged by a plurality of springs disposed on the concentric circle of the friction plate, the frictional force can be applied to the given gears over the entire area of the friction plate, which not only can apply a uniform frictional force but also can prevent the friction plate from wearing down unevenly.

In addition, according to the present invention as set forth in the fourth aspect, because the case includes two half-divided cases and is mounted onto the handle bar from the upward and downward directions, there can be enhanced the efficiency of an operation to be executed when mounting the throttle-opening detecting apparatus onto the handle bar.

What is claimed is:

1. A throttle-opening detecting apparatus comprising:
   a case mounted on a handle bar of a vehicle;
   a throttle grip mounted on a leading end side of the handle bar from the case so as to be rotatable with respect to the handle bar;
   a throttle-opening-sensor incorporated in the case for detecting a rotation angle of the throttle grip;
   a friction plate applying a frictional force in an opposite direction with respect to the rotation of the throttle grip to the throttle grip while the throttle grip is rotated; and
   a gear mechanism including a plurality of gears working with the throttle grip, the gear mechanism being interposed between the throttle grip and the throttle-opening sensor.

2. The throttle-opening detecting apparatus as set forth in claim 1,
   wherein the friction plate is urged toward one of the gears of the gear mechanism by a plurality of springs.

3. The throttle-opening detecting apparatus as set forth in claim 2, wherein the friction plate is formed as a circular ring including a through hole in such a manner that the handle bar is inserted in the substantially central portion thereof, and the plurality of springs are concentrically contacted with the friction plate.

4. The throttle-opening detecting apparatus as set forth in claim 1, wherein the case includes two half-divided cases, the two half-divided cases being respectively mounted onto the handle bar from an upper and a lower directions of the apparatus so as to be held the handle bar therebetween.

5. The throttle-opening detecting apparatus as set forth in claim 2, wherein the case includes two half-divided cases, the two half-divided cases being respectively mounted onto the handle bar from an upper and a lower directions of the apparatus so as to be held the handle bar therebetween.

6. The throttle-opening detecting apparatus as set forth in claim 3, wherein the case includes two half-divided cases, the two half-divided cases being respectively mounted onto the handle bar from an upper and a lower directions of the apparatus so as to be held the handle bar therebetween.

7. The throttle-opening detecting apparatus as set forth in claim 1, wherein the throttle-opening sensor is mounted on the upper side of the case.

8. The throttle-opening detecting apparatus as set forth in claim 2, wherein the throttle-opening sensor is mounted on the upper side of the case.

9. The throttle-opening detecting apparatus as set forth in claim 3, wherein the throttle-opening sensor is mounted on the upper side of the case.

10. The throttle-opening detecting apparatus as set forth in claim 4, wherein the throttle-opening sensor is mounted on the upper side of the case.

* * * * *